(12) United States Patent
Biasiotto et al.

(10) Patent No.: US 7,422,192 B2
(45) Date of Patent: *Sep. 9, 2008

(54) VALVE FOR FLUIDS HAVING A DIAPHRAGM SHUTTER CONTROLLED BY SHAPE MEMORY MEANS ACTING ALSO AS DEFROSTING MEANS

(75) Inventors: Marco Biasiotto, Turin (IT); Francesco Butera, Turin (IT); Stefano Alacqua, Rivoli Cascine Vica (IT); Alessandro Zanella, Turin (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 132 days.

This patent is subject to a terminal disclaimer.

(21) Appl. No.: 11/515,773

(22) Filed: Sep. 6, 2006

(65) Prior Publication Data

US 2007/0051911 A1 Mar. 8, 2007

(30) Foreign Application Priority Data

Sep. 8, 2005 (EP) .................................. 05425629

(51) Int. Cl.
*F16K 31/00* (2006.01)
*F16K 31/18* (2006.01)
(52) U.S. Cl. ..................................... 251/11; 251/335.2
(58) Field of Classification Search .................. 251/11, 251/331, 335.2
See application file for complete search history.

(56) References Cited

U.S. PATENT DOCUMENTS 5,325,880 A * 7/1994 Johnson et al. ................. 137/1
5,345,963 A * 9/1994 Dietiker ......................... 137/12
7,198,248 B2 * 4/2007 Butera et al. ................... 251/11

FOREIGN PATENT DOCUMENTS

| DE | 296 13 251 U1 | 11/1996 |
| DE | 101 33 013 A1 | 1/2003 |
| EP | 1 653 133 | 5/2006 |

OTHER PUBLICATIONS

Patent Abstracts of Japan vol. 008, No. 220, Oct. 6, 1984 & JP 59 103088, Jun. 14, 1984.
Patent Abstracts of Japan vol. 011, No. 082, Mar. 12, 1987 & JP 61 236974 A, Oct. 22, 1986.

* cited by examiner

*Primary Examiner*—John K Fristoe, Jr.
(74) *Attorney, Agent, or Firm*—Nixon & Vanderhye P.C.

(57) ABSTRACT

Described herein is a valve for fluids, liquids or dusts, which can be used to particular advantage for controlling openings for passage of cooling air in refrigerating apparatuses or the like. The valve comprises a diaphragm open/close element having a central part and a peripheral edge connected, respectively, to a central support and to a peripheral support. Said supports are axially displaceable with respect to one another between a first relative end position and a second relative end position corresponding, respectively, to the open condition and to the closed condition of the valve, or vice versa. The relative displacement in an axial direction of said first and second supports is controlled by shape-memory means, including at least one shape-memory wire, which extends at least in part along the periphery of the diaphragm and is activated by electrical supply means. The heating of the wire is exploited to remove any possible formation of ice or frost that might tend to prevent correct movement of the diaphragm.

3 Claims, 4 Drawing Sheets

VALVE FOR FLUIDS HAVING A DIAPHRAGM SHUTTER CONTROLLED BY SHAPE MEMORY MEANS ACTING ALSO AS DEFROSTING MEANS

BACKGROUND OF THE INVENTION

The present invention relates to the field of valves for fluids, liquids or dusts.

In a preceding European patent application No. 04425810.1 (still secret at the date of filing of the present application) the present applicant has presented a valve for fluids, liquids or dusts, comprising a diaphragm open/close element having a central part and a peripheral edge that are axially mobile with respect to one another between a first relative end position and a second relative end position corresponding, respectively, to the open condition and to the closed condition of the valve, or vice versa, and shape-memory actuator means for controlling the relative position of said central part and said peripheral edge, in which said shape-memory means are operatively set between the central part and the peripheral edge of the diaphragm and are substantially parallel to the diaphragm, and in which said shape-memory means moreover comprise at least one shape-memory wire that is activated by electrical supply means.

SUMMARY OF THE INVENTION

The purpose of the invention is to provide a valve of the type specified above that is suitable for being used to advantage in applications in low-temperature environments, for example for controlling an opening for passage for cooling air in a freezing apparatus, where there exists the risk of sticking of the diaphragm against the fixed part that co-operates therewith on account of formation of frost or ice.

With a view to achieving said purpose, the subject of the invention is a valve of the type referred to above, characterized in that said shape-memory wire extends at least in part along the periphery of the diaphragm.

Thanks to said characteristic, the electrical heating of the wire causes elimination of any possible formation of frost or ice that might tend to prevent correct movement of the diaphragm.

BRIEF DESCRIPTION OF THE DRAWINGS

Further characteristics and advantages of the invention will emerge from the ensuing description with reference to the annexed plate of drawings, which are provided purely by way of non-limiting example and in which:

FIG. 1 is a partially sectioned perspective view of a ventilation-air-vent outlet of the cab of a lorry, provided with a valve of the type forming the subject of the previous application; and FIGS. 2, 3 are cross-sectional views of the air outlet of FIG. 1 in two different operating conditions;

DETAILED DESCRIPTION OF THE INVENTION

Figure 1:
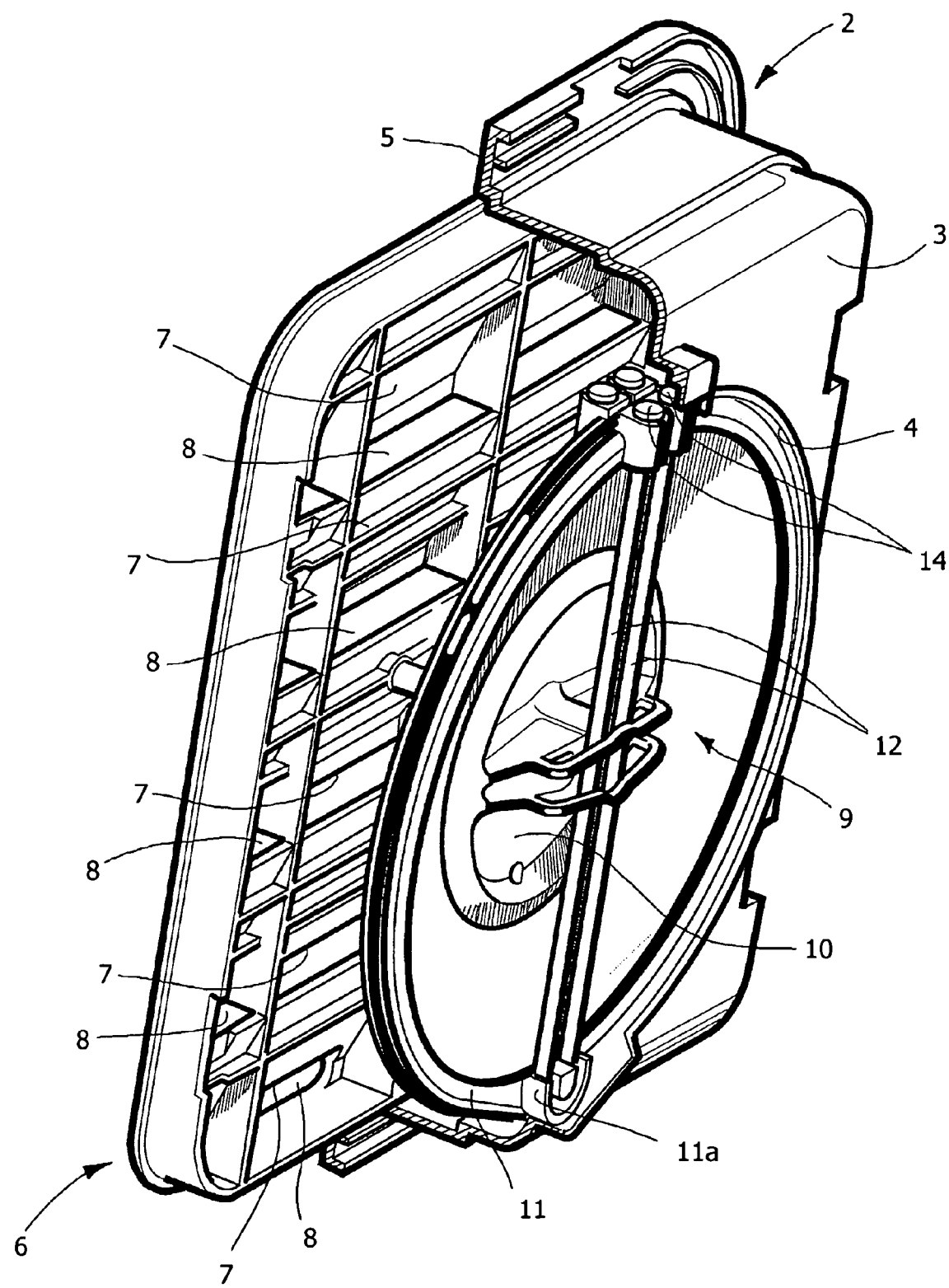
FIGS. 1-3 refer to the valve already proposed in the European patent application No. 04425810.1; namely.
Figure 2:
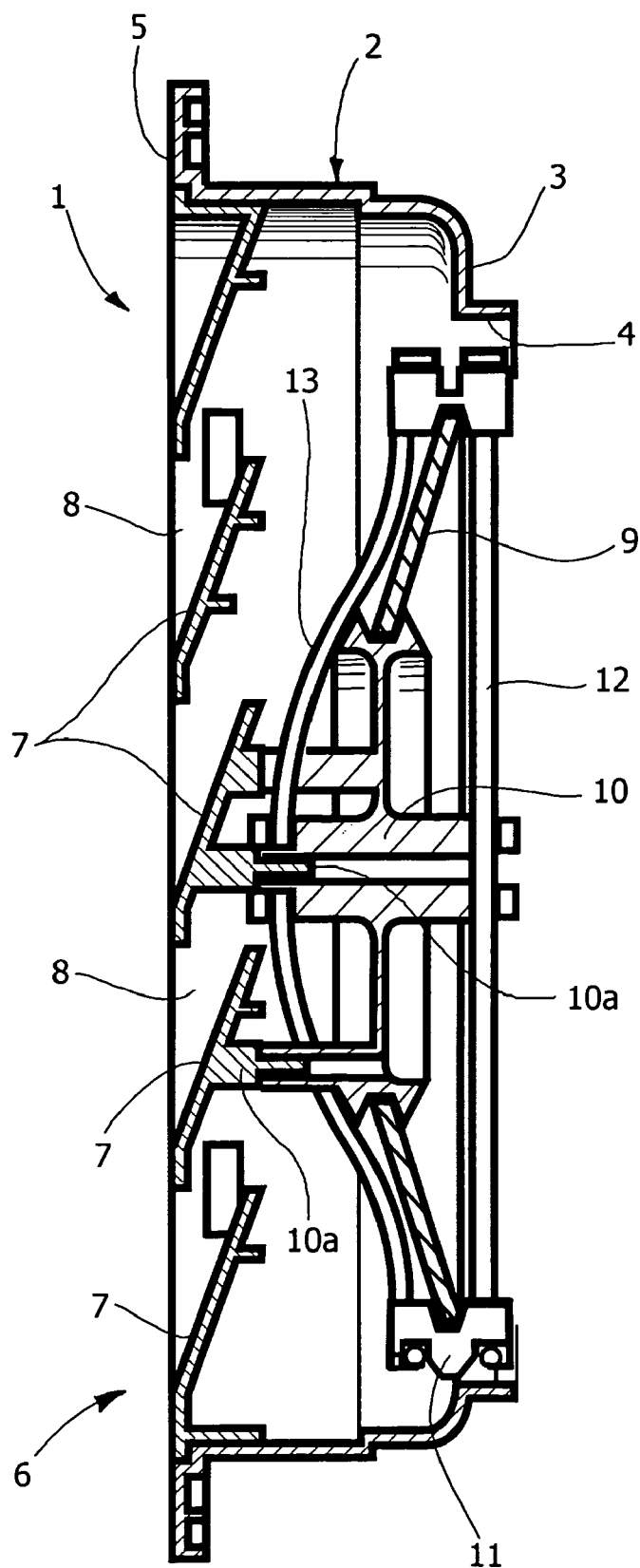
Figure 3:
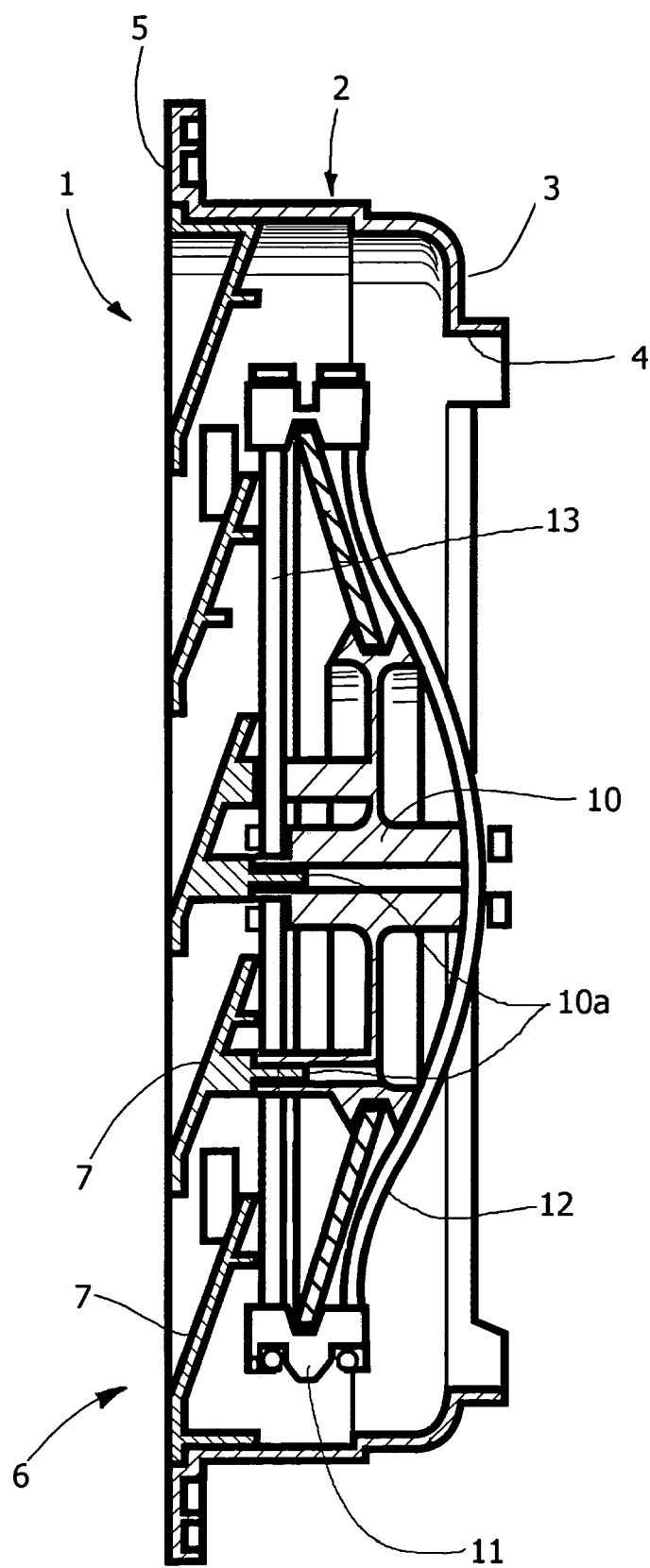

With reference to FIGS. 1-3, number 1 designates as a whole an air outlet designed to enable exit of the ventilation air from the cab of a lorry. Of course, the example provided herein does not have any limiting effect on the applicability of the valve, which is altogether general. The valve can be in fact associated to any type of outlet or passage for air in any type of device, or can even be used as valve for liquids or for dusts, in any suitable application.

With reference to the specific example, the air outlet 1 comprises a casing 2 made of plastic material having a box-like conformation, with an end wall 3 having a circular opening 4 and an opposite open side having a perimetral edge 5, mounted in an area corresponding to which is a frame 6 with a plurality of parallel fins 7 set at a distance apart from one another, rigidly connected to the frame 6 and defining between them slits 8 for exit of the air coming from the cab of the lorry. Obviously, as has been said, an air outlet of the type illustrated herein could be used also as air outlet for aeration in buildings or premises of any type, such as, for example, greenhouses or industrial sheds. The communication through the opening 4 is controlled by a diaphragm open/close element 9, comprising a diaphragm made of rubber with a central part fixed to a first support 10, and a peripheral sealing edge that is fixed to an annular support 11 and that is able to ensure fluid tightness in an area corresponding to the edge of the circular opening 4. The diaphragm made of rubber 9 is deformable so as to enable a relative axial displacement of the peripheral support 11 with respect to the central part 10, which is rigidly connected by means of supporting rods 10a to the structure of the frame 6. The peripheral support 11 is consequently axially displaceable, with respect to the casing 2 of the air outlet, between a first operative position, illustrated in FIG. 2, in which the peripheral edge 9a of the diaphragm 9 ensures fluid tightness in an area corresponding to the opening 4, and an opposite position (FIG. 3), in which the annular support 11 is at an axial distance from the opening 4, so that the air is free to pass through said opening and to come out through the slits 8. The diaphragm 9 made of rubber is in a dead-centre position, so that when it is moved away from one of its two opposite positions illustrated in FIGS. 2 and 3, it displaces, as a result of its own elasticity, towards the other position, once it has exceeded the dead centre.

The movement of the diaphragm open/close element 9 between the two extreme conditions illustrated in FIGS. 2 and 3 is controlled by means of a first wire and a second wire made of a shape-memory metal alloy, designated, respectively, by 12 and 13. Preferably, as illustrated, each of the two wires 12, 13 makes a U turn around an appendage 11a of the edge of the peripheral frame 11, so as to present the two ends adjacent to one another in electrical connection with two contacts 14 designed to be connected to electrical supply means (not illustrated). In the deactivated condition, the shape-memory wire is in a distended condition (like the wire 13 in FIG. 2 or the wire 12 in FIG. 3). Assuming the condition of FIG. 2, an electrical supply of the wire 13 causes contraction thereof. Since the wire is secured to the peripheral frame 11 in two diametrally opposite areas of said frame, shortening of the wire 13 causes the diametrally opposite areas of the peripheral frame 11 to which the wire is connected to tend to line up in the same plane with the central part of the wire in contact with the central frame 10. This determines an axial displacement of the peripheral frame 11 up to the opposite position illustrated in FIG. 3, said movement being favoured by the diaphragm 9 itself once the latter has exceeded its dead-centre position. Once the condition illustrated in FIG. 3 is reached, the wire 13 can be deactivated, in so far as it is the very elasticity of the diaphragm 9 that tends to keep the peripheral frame 11 in the condition illustrated in FIG. 3, set at a distance from the edge of the opening 4 of the casing 2. As already said, in said condition, a flow of air F coming from the internal environment can enter the casing 2 and flow out through the slits 8. When the air outlet is to be closed again, it is sufficient to activate the wire 12 so as to cause a contraction thereof, which determines displacement of the peripheral frame 11 with respect to the central part 10 into the relative position illustrated in FIG. 2. Also during said passage, the movement is favoured by the very elasticity of the diaphragm 9 once it has exceeded its dead-centre position.

Of course, as already illustrated more than once, even though the preferred example of embodiment described herein makes use of a bistable diaphragm, it would also be possible to envisage the use of a monostable diaphragm open/close element, in which shape-memory actuator means are used for moving the diaphragm away from its stable condition and elastic means are used for recalling the diaphragm into said configuration after a deactivation of the shape-memory means.

Also the conformation and arrangement of the shape-memory means can be any whatsoever, even though the one illustrated herein presents particular advantages of simplicity and efficiency.

The device can also be used for controlling in a variable way the section of passage of a duct, for example for a gas. In this case, it is possible, for example, to provide an annular body valve above an end of the duct and possibly control the diaphragm open/close element in a proportional way, with a closed-loop control, as already mentioned above.

Figure 4:
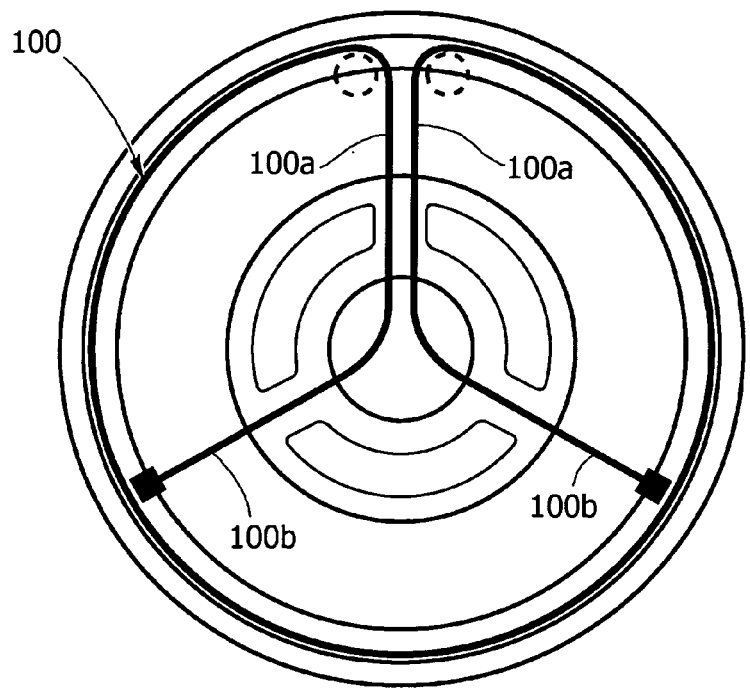
FIG. 4 is a front view of the valve according to the invention.

With reference now to FIG. 4, parts that are in common therein to those of FIGS. 1-3 are designated by the same reference numbers. The basic characteristic of the invention forming the subject of the present application is that of providing shape-memory means comprising at least one shape-memory wire that is activated electrically and that extends at least in part along the periphery of the diaphragm. In this way, heating of the wire caused by the passage of electric current, in addition to causing activation in order to control the diaphragm, also brings about removal of any possible formation of frost or ice between the diaphragm and the fixed part co-operating with the diaphragm that might tend to prevent correct movement of the diaphragm.

The invention is consequently particularly indicated for applications in low-temperature environments, for example for controlling an opening for passage of refrigeration air in a refrigeration apparatus, such as, for example, a refrigerator of the "no-frost" type.

In the example illustrated; a single shape-memory wire 100 is provided with a portion that extends along the entire periphery of the diaphragm, and two terminal parts that run parallel and adjacent to one another for a radial stretch 100a, and then diverge into two stretches 100b that form an angle of approximately 120° with respect to one another.

Of course, the arrangement could be different from what is illustrated, it remaining that the wire has to run at least over part of the periphery of the diaphragm.

Figure 5:
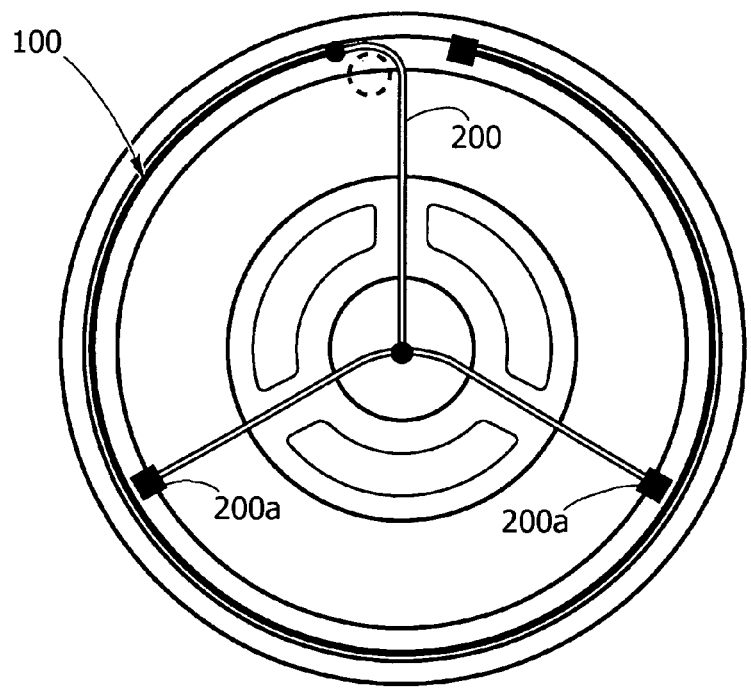
FIG. 5 shows a variant of the valve illustrated in FIG. 4.

For example, FIG. 5 shows a variant in which the shape-memory wire 100 covers only the circumferential portion along the periphery of the diaphragm and is prolonged in an inactive wire or thread 200, for example made of nylon or steel, terminating with its two ends 200a fixed to the periphery of the diaphragm. This solution is useful for reducing the costs by reducing the length of the shape-memory wire and/or enables having a greater flexibility in the design stage in relation to the choice of the fixing points, and according to requirements linked to the decomposition of the forces involved and to the reduction of friction.

In the specific case of the application in a refrigerator, the valve diaphragm according to the invention is preferably fixed to the internal surface of the rear wall of the refrigerator, preferably at the top, in an area corresponding to an outlet mouth for the refrigeration air.

Of course, without prejudice to the principle of the invention, the details of construction and the embodiments may vary widely with respect to what is described and illustrated herein purely by of way of example, without thereby departing from the scope of the present invention.

What is claimed is:

1. A valve for fluids, liquids or dusts, comprising a diaphragm open/close element having a central part and a peripheral edge that are axially mobile with respect to one another between a first relative end position and a second relative end position corresponding respectively to the open condition and to the closed condition of the valve, or vice versa, and shape-memory actuator means for controlling the relative position of said central part and said peripheral edge, said valve being characterized in that said shape-memory means are operatively set between the central part and the peripheral edge of the diaphragm and are substantially parallel to the diaphragm and in that said shape-memory means comprise at least one shape-memory wire that is activated by electrical supply means and that extends at least in part along the periphery of the diaphragm.

2. The valve according to claim 1, wherein said shape-memory wire includes a circumferential stretch extending for at least one portion of the periphery of the diaphragm, with two ends adjacent to one another, from which it extends in two parallel and adjacent radial stretches that converge from the periphery towards the centre of the diaphragm and then diverge again towards the periphery with two radial stretches, which form an angle, for example, of approximately 120°, and terminate in two ends operatively fixed to two respective peripheral portions of the diaphragm.

3. The valve according to claim 1, wherein said shape-memory wire covers only one circumferential portion along the periphery of the diaphragm and is prolonged in the form of an inactive thread or wire, for example made of nylon or steel, having a first radial stretch converging from the periphery to the centre of the diaphragm and then diverging into two radial stretches with two ends operatively fixed to the periphery of the diaphragm.

* * * * *